(12) United States Patent
Feng

(10) Patent No.: US 11,014,156 B2
(45) Date of Patent: May 25, 2021

(54) EXTRUDED METAL FLOW 3D PRINTER

(71) Applicant: ASIA AMERICA INDUSTRIAL MANUFACTURE INC., Guangdong (CN)

(72) Inventor: Jian Feng, Guangdong (CN)

(73) Assignee: ASIA AMERICA INDUSTRIAL MANUFACTURE INC., Guangdong (CN)

( * ) Notice: Subject to any disclaimer, the term of this patent is extended or adjusted under 35 U.S.C. 154(b) by 431 days.

(21) Appl. No.: 15/128,989

(22) PCT Filed: Nov. 13, 2014

(86) PCT No.: PCT/CN2014/090983
§ 371 (c)(1),
(2) Date: Sep. 26, 2016

(87) PCT Pub. No.: WO2015/172540
PCT Pub. Date: Nov. 19, 2015

(65) Prior Publication Data
US 2017/0274454 A1    Sep. 28, 2017

(30) Foreign Application Priority Data
May 15, 2014  (CN) .................. 201410206527.X

(51) Int. Cl.
*B22F 3/105* (2006.01)
*B23K 15/00* (2006.01)
(Continued)

(52) U.S. Cl.
CPC .............. *B22F 3/105* (2013.01); *B22F 10/00* (2021.01); *B33Y 30/00* (2014.12); *B22F 10/10* (2021.01);
(Continued)

(58) Field of Classification Search
CPC ........ B22F 3/105; B22F 3/1055; B22F 3/115; B22F 2003/1056; B22F 2999/00; B23K 15/0086; B29C 67/00; Y02P 10/295
See application file for complete search history.

(56) References Cited

U.S. PATENT DOCUMENTS 5,961,862 A * 10/1999 Lewis .................. B23K 26/144
219/121.63
6,751,516 B1 * 6/2004 Richardson ........... B22F 3/1055
700/118
(Continued)

*Primary Examiner* — Alex M Valvis

(57) ABSTRACT

An extruded metal flow 3D printer comprising a rack including a workbench capable of moving along n X-axis and Y-axis direction, and a head capable of moving along an Z-axis direction; a printing device including a printing head, a high frequency coil and a high frequency electric induction heating device; the printing heal including a tungsten steel nozzle, a ceramic tube bank, a high temperature resistant ceramic protective sleeve, and a stainless steel end cover; the tungsten steel nozzle having an extrusion hole; a feeding device; the head comprising at least one laser mounted on a lower end face thereof and configured to locally preheat and melt a metal layer printed from the metal wire or enhance a binding force between metal layers, so that the print effect and model molding effect of the present invention can be improved, enhancing the marketability.

9 Claims, 8 Drawing Sheets

(51) Int. Cl.
*B33Y 30/00* (2015.01)
*B22F 10/00* (2021.01)
*B22F 10/10* (2021.01)

(52) U.S. Cl.
CPC ....... *B22F 2999/00* (2013.01); *B23K 15/0086* (2013.01); *Y02P 10/25* (2015.11)

(56) References Cited

U.S. PATENT DOCUMENTS

2013/0320598 A1* 12/2013 Atkins ................. B22F 3/1055
  264/497
2016/0311025 A1* 10/2016 Kaneko ................ B22F 3/1055
2016/0325383 A1* 11/2016 Xu ........................ B23P 23/04

* cited by examiner

EXTRUDED METAL FLOW 3D PRINTER

CROSS-REFERENCE TO RELATED APPLICATION

This application claims priority to PCT Application No.: PCT/CN2014/090983, having a filing date of Nov. 13, 2014, based off of Chinese Application No 201410206527.X, having a filing date of May 15, 2014, the entire contents of which are hereby incorporated by reference.

FIELD OF THE INVENTION

The present invention relates generally to the technical field of 3D printer, and more particularly to a structurally simple and low cost extruded metal flow 3D printer for locally preheating and melting a metal layer printed using a metal wire or enhancing a binding force between metal layers, so as to improve the print effect and model molding effect greatly.

BACKGROUND OF THE INVENTION

The 3D printer is a machine of rapid forming technique. It is a technology to construct objects by printing layer by layer using binding material, such as powdered metal or plastic, based on digital model file. It was often used for modeling in die making and industrial design in the past. Now it is gradually used for direct manufacturing of mechanical products, meaning this technology is being popularized.

Design process of 3D printing: the software modeling is executed by computer. The built 3D model is "analyzed" into sections layer by layer, i.e. tangent planes, so as to guide the printer to print layer by layer. The thin layers are piled up until a solid object is formed. The major difference between the multifunctional 3D printer and conventional printer is that the former one uses real raw material as "ink". Said raw material is hot-melt adhesive string in general. The end of the hot-melt adhesive string is inserted in the hot melt printing head of 3D printer, the hot melt printing head is electrically heated to melt the hot-melt adhesive string. The molten adhesive flows out of the lower end of hot melt printing head, printing layer by layer, and the thin layers are piled up to implement solid 3D object forming.

At present, the 3D printer is universally used for forming plastic models, few 3D printers are used for forming metal models, and the metal models formed by the 3D printer for forming metal models have nonideal performance in precision and surface finish quality, and the overall structure is very complex, the cost is relatively high.

SUMMARY OF INVENTION

The objective of the present invention is to overcome the above mentioned disadvantages by providing extruded metal flow 3D printer comprising:

a frame including a workbench capable of moving along an X-axis and Y-axis direction, and a head capable of moving along an Z-axis direction;

a printing device including a printing head fixed in the head via a connecting base, a high frequency coil and a high frequency electric induction heating device for heating the printing head; the printing head including a tungsten steel nozzle, a ceramic tube bank disposed inside the tungsten steel nozzle, a high temperature resistant ceramic protective sleeve sleeved on an external surface of the tungsten steel nozzle, and a stainless steel end cover covered on an upper end of the tungsten steel nozzle; the tungsten steel nozzle having an extrusion hole;

a feeding device mounted on the frame and configured to convey a metal wire to the printing device;

wherein the head comprises at least one laser mounted on a lower end face thereof and configured to locally preheat and melt a metal layer printed by the metal wire or enhance a binding force between the metal layers; the laser is tilted, and a light beam irradiated from the laser is focused under the printing head; the frame further comprises an inert gas feeder mounted thereon and configured to supply inert gas to the printing head, so that the printing head can jet inert gas.

More particularly, wherein the laser is a fiber optic coupling laser; there are two fiber optic coupling lasers, located on both sides of the printing head respectively; the cross point of the light beams irradiated from the lasers is straight under the printing head.

More particularly, wherein the feeding device comprises a wire reel disposed on the frame and configured to place the metal wire, a first servomotor configured to rotate the wire reel, a second servomotor disposed in the head, a wire guide base disposed at a front end of the second servomotor; the wire guide base includes a wire pressing wheel and an active wire feeding wheel disposed therein; the active wire feeding wheel and wire pressing wheel convey the metal wire jointly.

More particularly, wherein the wire guide base comprises an opening disposed in a middle thereof, an adjustable elastic mounting base disposed on one side of the wire guide base; the wire pressing wheel is mounted in the elastic mounting base, and its outer edge is exposed in the opening; the active wire feeding wheel is mounted on a shaft of the second servomotor and exposed in the opening; a gap is formed between the active wire feeding wheel and the wire pressing wheel for clamping the conveyed metal wire; the wire guide base includes through holes respectively disposed on an upper end and lower end thereof and corresponding to the gap; the through hole corresponds to a hole disposed on the printing heat and provided for the metal wire passing therethrough; the wire pressing wheel is formed with an ring, groove disposed on an outer surface thereof and configured to clamp the metal wire.

More particularly, wherein the inert gas feeder comprises a gas tank mounted outside the frame, a regulating valve, and a gas tube; the gas tube is extended into the head and connected to a cooling hole disposed in the printing head and configured to jet inert gas; the connecting base comprises a recess disposed at a front end thereof and provided for the printing head installed therein, and a gas orifice disposed at a rear end thereof and provided for the recess connected therewith; the gas orifice is connected to the gas tube.

More particularly, wherein the tungsten steel nozzle comprises an annular mounting part disposed at an upper end thereof, a collar flange disposed at a lower end thereof, and a conical end formed at a lower end of the collar flange and having the extrusion, hole; an aperture of the extrusion hole is smaller than the diameter of metal wire.

More particularly, wherein the ceramic tube bank comprises an inner ceramic tube and an outer ceramic tube nested with each other and mounted in a holding position in an inner chamber of the tungsten steel nozzle; the inner ceramic tube having an upper end face is even with an upper end face of the outer ceramic tube; the inner ceramic tube having a lower end is extended out of a lower end face of the outer ceramic tube and, connected to the extrusion hole of the tungsten steel nozzle; a first space is formed between an outer wall of the inner ceramic tube and an inner wall of the outer ceramic tube; a second space is formed between an outer wall of the outer ceramic tube and an inner wall of holding position in tungsten steel nozzle; the stainless steel end cover includes an wire entrance hole corresponding to the inner ceramic tube.

More particularly, wherein the high temperature resistant ceramic protective sleeve is sleeved on the external surface of tungsten steel nozzle and contacted with the collar flange at the lower end of tungsten steel nozzle; the high temperature resistant ceramic protective sleeve and an outer wall of tungsten steel nozzle comprises a plurality of passages disposed therebetween for gas passing therethrough; the tungsten steel nozzle includes a plurality of tilted gas blow-out holes disposed at the collar flange and connected to the passages; the high temperature resistant ceramic protective sleeve includes a clearance groove arranged in a lower end of an inner wall thereof and engaged with the gas blow-out hole.

More particularly, wherein the tungsten steel nozzle comprises a plurality of spaced first annular bulges formed under the annular mounting position, a plurality of second annular bulges disposed at the lower end thereof and corresponding to the first annular bulge for the high temperature resistant ceramic protective sleeve being concentrically sleeved on the external surface of tungsten steel nozzle to form said passage, and a plurality of gas guide grooves opened downward under the annular mounting position thereof for the annular mounting position being connected to the passage; the first annular bulge is located between two adjacent gas guide grooves.

More particularly, wherein the frame further comprises a water-cooling plant disposed thereon; the high frequency coil having a copper pipe is formed with a flow channel for cold water passing therethrough; the water-cooling plant is connected to the flow channel via a pipe.

Compared with the existing technology, the present invention has the following beneficial effects:

1. There are two lasers adapted to the printing head under the head, which are located on both sides of printing head respectively, and the cross point of the light beams from the lasers is straight below the printing head. The laser can locally preheat and melt the metal layer printed from metal wire or enhance the binding force between metal layers, so as to enhance the print effect and model molding effect of the present invention, contributing to the marketability.

2. The present invention has simple structure and low manufacturing cost, enhancing the marketability.

3. The present invention has a water-cooling plant, the copper pipe of the heating coil forms a passage for cold water, so that it has good cooling effect, improving the service life and print effect of the present invention.

4. The present invention has an inert gas feeder, which jets inert gas when the printing head is working, so as to prevent the metal fluid jetted, by the printing head from being oxidized when forming metal deposition layer on the workbench, and to form the metal fluid by cooling. Thus, the work quality of the present invention is upgraded effectively to manufacture high quality metal r model products.

5. The open heating ring mounted at the lower end of tungsten steel nozzle only heats the lower end of tungsten steel nozzle. In addition, the ceramic tube hank is heat insulated to some extent, preventing the metal wire through the ceramic tube bank from being heated and softened too early, only the metal wire penetrating into the lower end of inner ceramic tube is heated to semisolid, so that the molten semisolid metal fluid can be extruded through the extrusion hole in the lower end of tungsten nozzle by solid metal wire in the metal wire transport process, forming a continuous filar semisolid metal fluid to enhance the print (extrusion) effect of printing head.

DETAILED DESCRIPTION OF THE PREFERRED EMBODIMENTS

Figure 1:
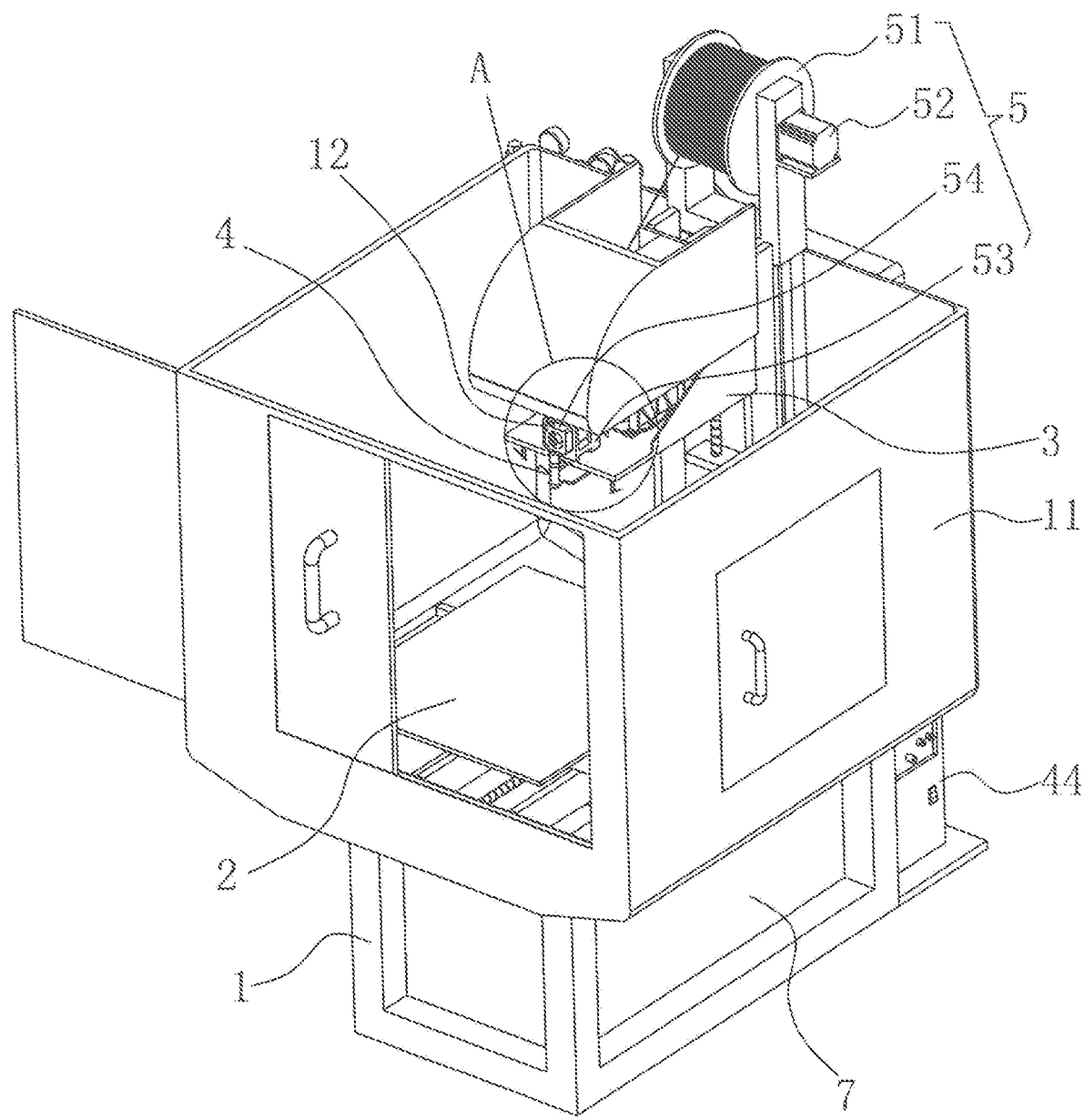
FIG. 1 is a stereogram of the present invention.
Figure 2:
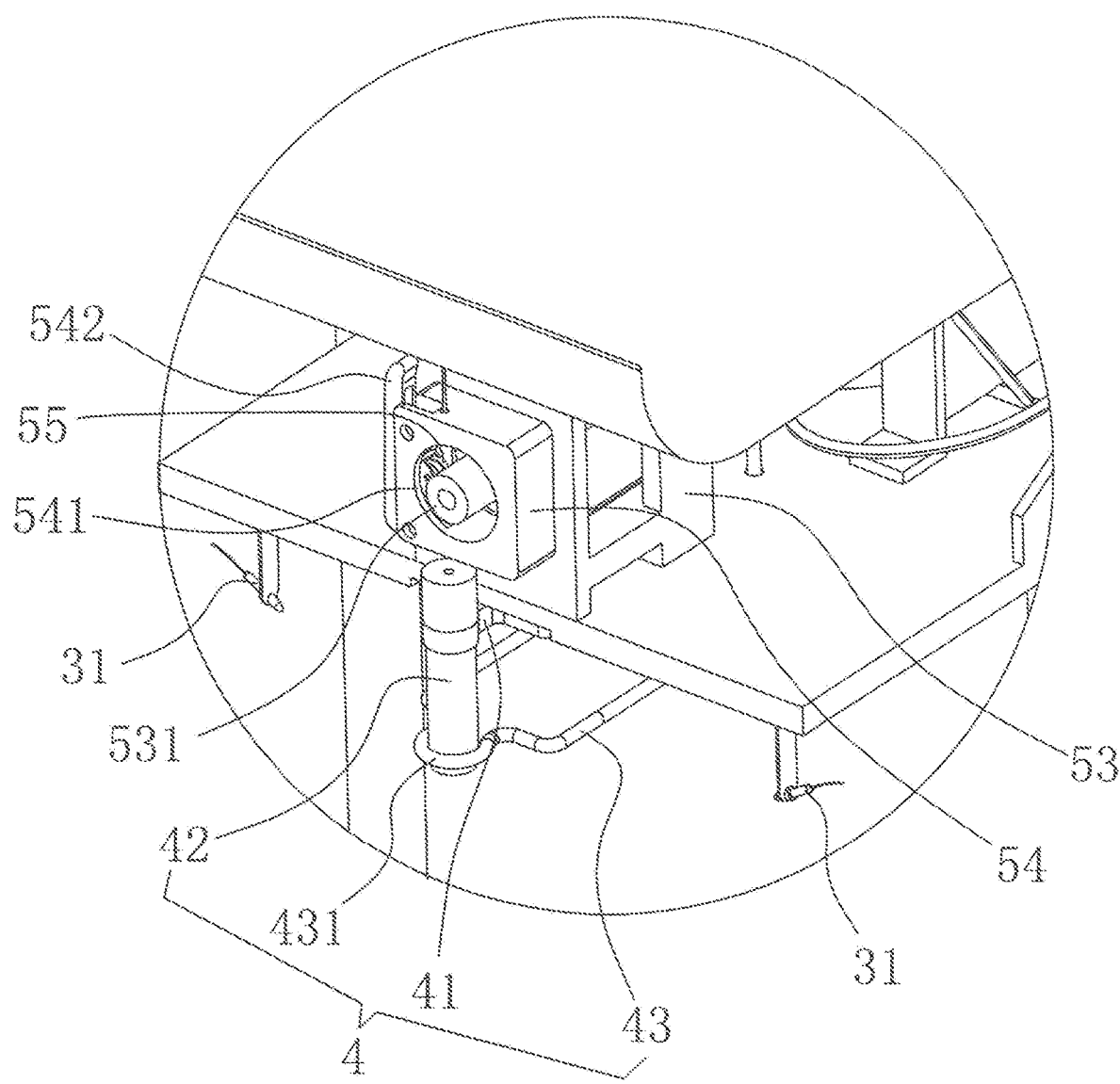
FIG. 2 is schematic diagram of an enlarged part A in FIG. 1.
Figure 3:
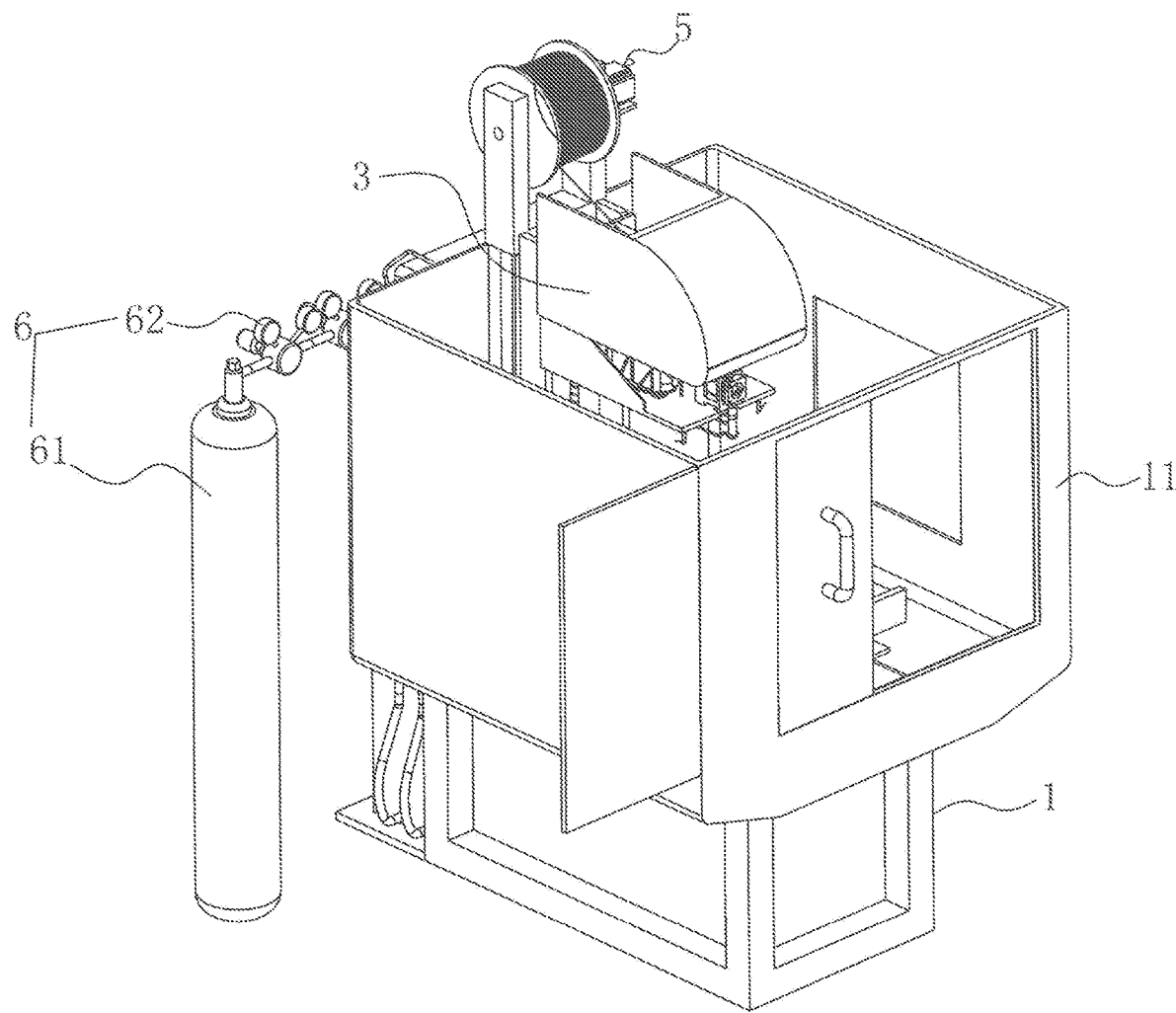
FIG. 3 is a stereogram from another viewing angle of the present invention.
Figure 4:
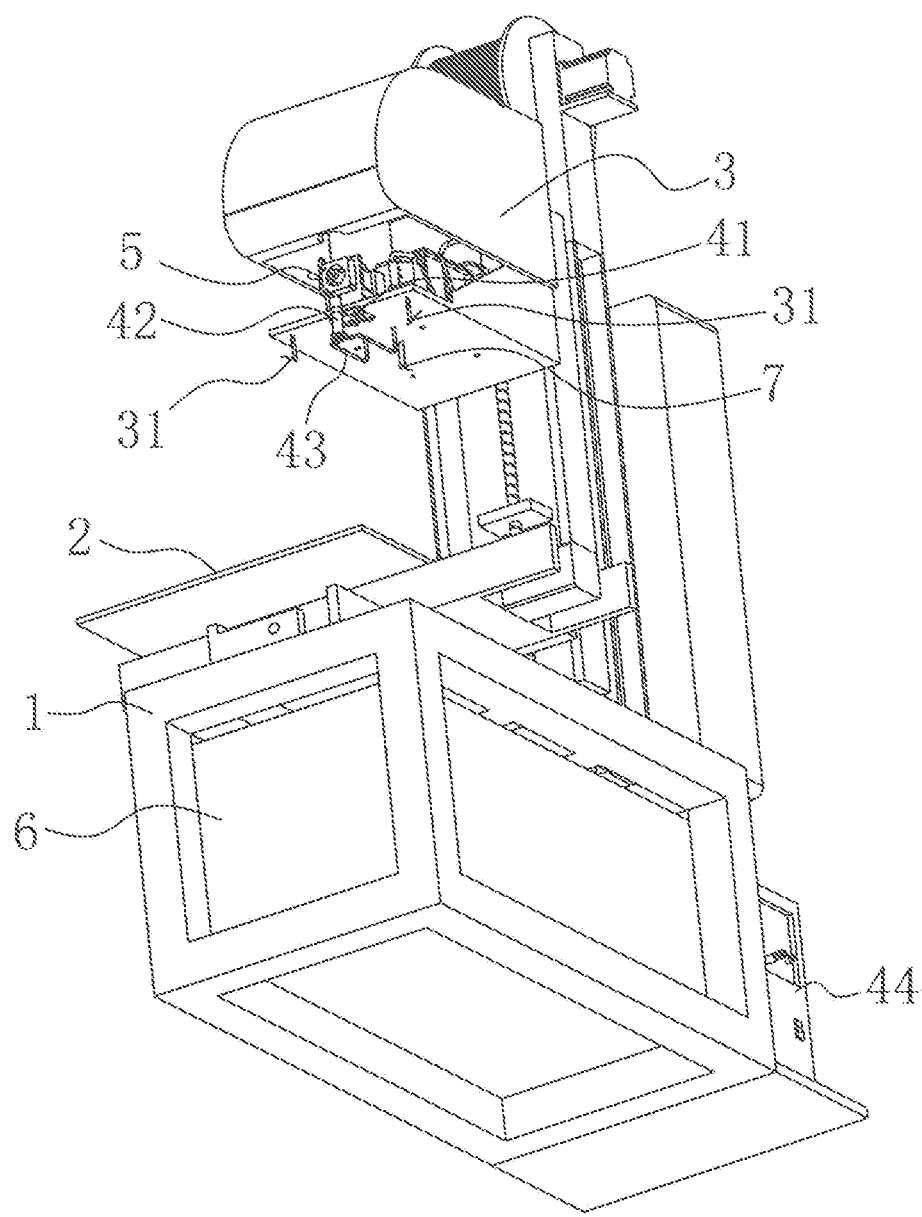
FIG. 4 is a stereogram of the present invention after the housing and inert gas feeder are removed.
Figure 5:
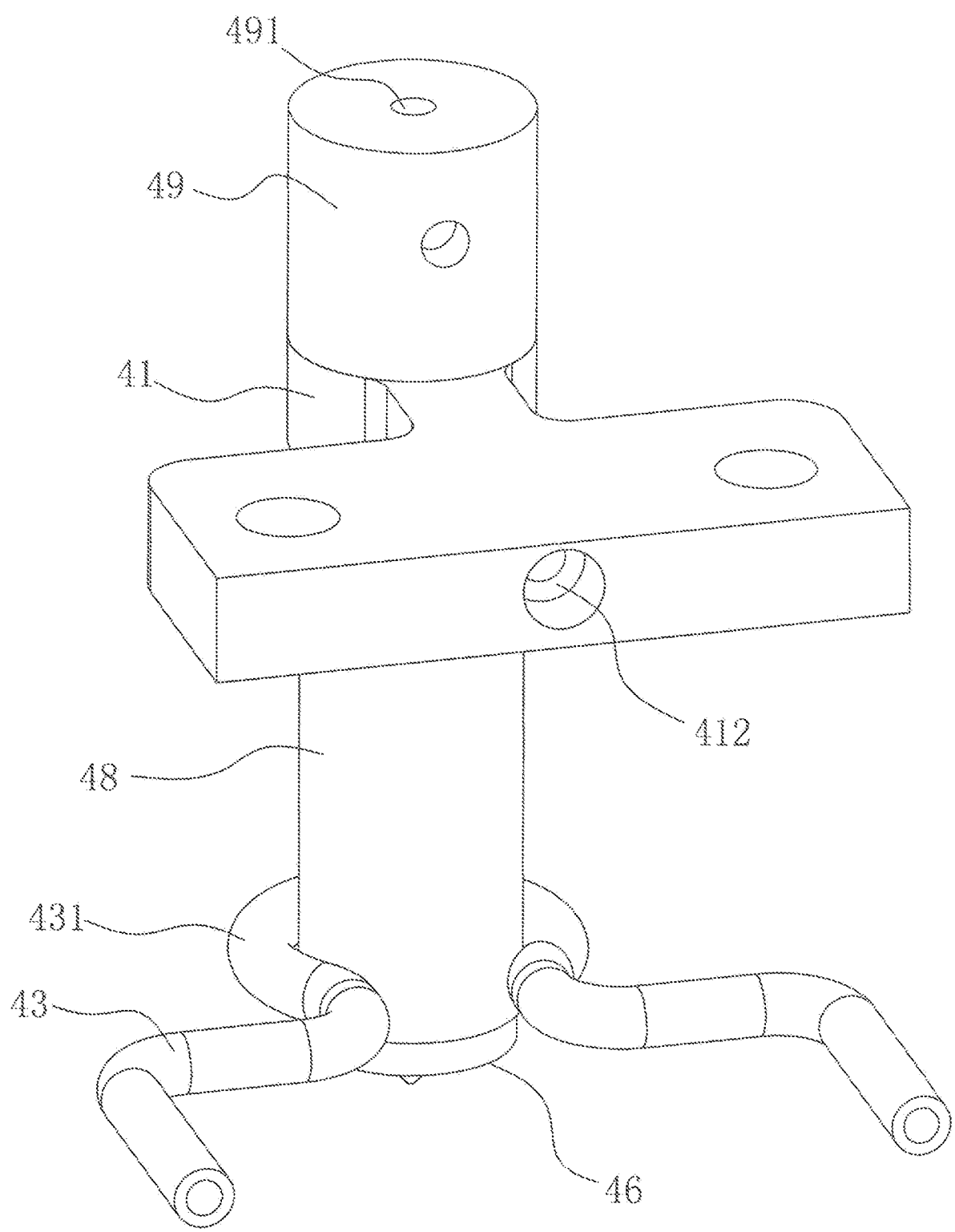
FIG. 5 is a schematic diagram of assembly of the printing head in the present invention.
Figure 6:
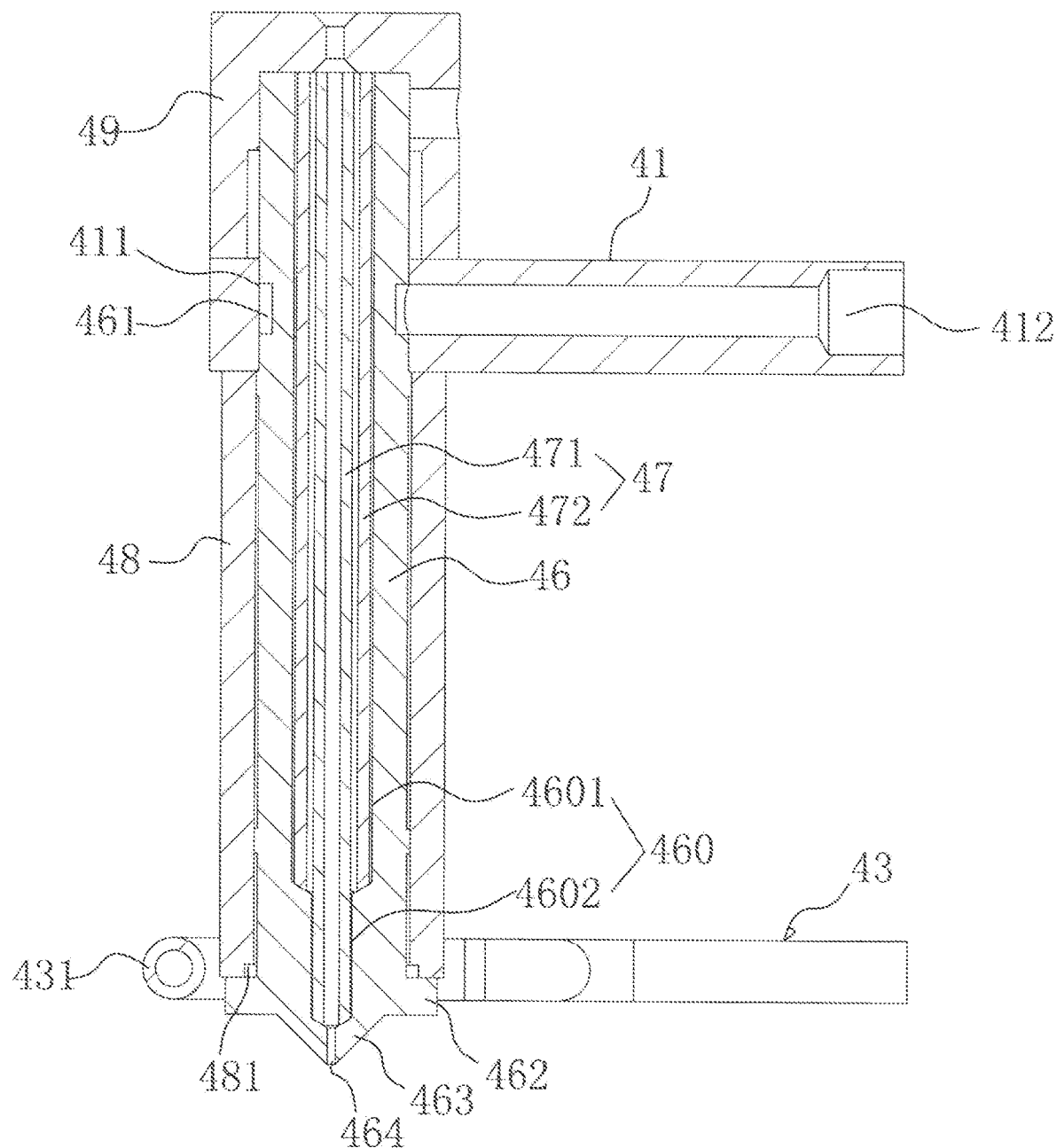
FIG. 6 is a sectional view of FIG. 5.
Figure 7:
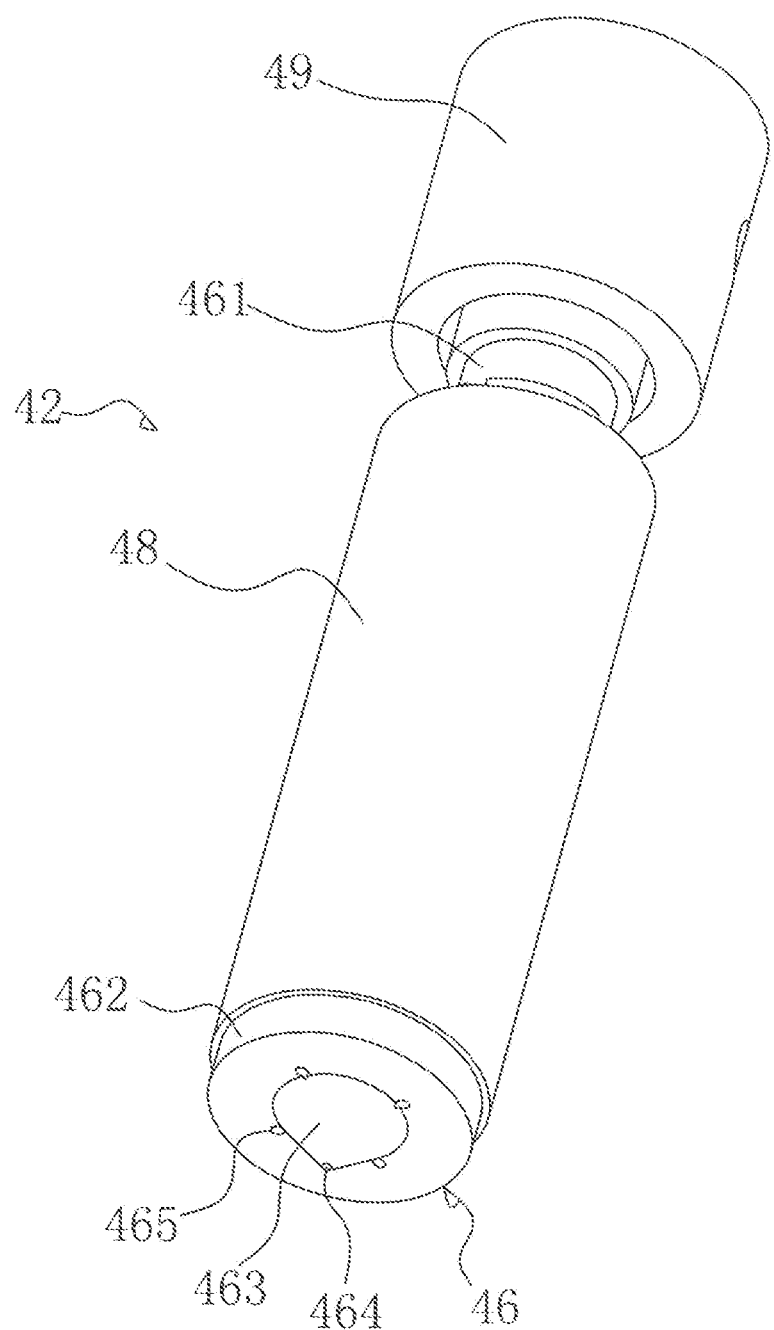
FIG. 7 is a schematic diagram of assembly of the printing head in the present invention.
Figure 8:
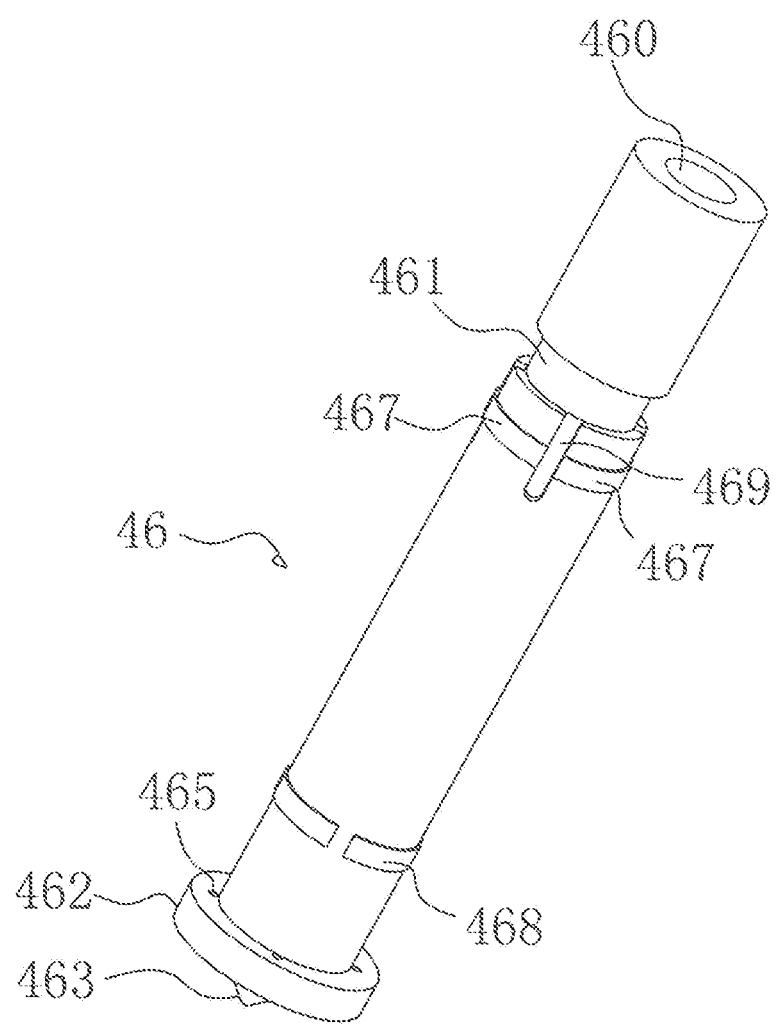
FIG. 8 is a schematic diagram of assembly of the tungsten steel nozzle in the present invention.

FIGS. 1-8 show an extruded metal flow 3D printer comprising: a frame (1) including a workbench (2) capable of moving along an X-axis and Y-axis direction, a head (3) capable of moving along an Z-axis direction, a printing device (4) installed in the head (3), a feeding device (5) mounted on the frame (1) and configured to convey a metal wire to the printing device (4), and a housing (11) installed on the frame (1).

The printing device (4) includes a printing head (42) fixed in the head (3) via a connecting base (41), a high frequency coil (43) and a high frequency electric induction heating device (44) for heating the printing head (42); the printing head (42) including a tungsten steel nozzle (46), a ceramic tube bank (47) disposed inside the tungsten steel nozzle (46), a high temperature resistant ceramic protective sleeve (48) sleeved on an external surface of the tungsten steel nozzle (46), and a stainless steel end cover (49) covered on an upper end of the tungsten steel nozzle (46); the tungsten steel nozzle (46) having an extrusion hole (464).

wherein the tungsten steel nozzle (46) comprises an annular mounting part (461) disposed at an upper end thereof, a collar flange (462) disposed at a lower end thereof, and a conical end (463) formed at a lower end of the collar flange (462) and having the extrusion hole (464); an aperture of the extrusion hole (464) is smaller than the diameter of metal wire.

wherein the ceramic tube bank (47) comprises an inner ceramic tube (471) and an outer ceramic tube (472) nested with each other and mounted in a holding position (460) in an inner chamber of the tungsten steel nozzle (46); the inner ceramic tube (471) having an upper end face is even with an upper end face of the outer ceramic tube (472); the inner ceramic tube (471) having a lower end is extended out of a lower end face of the outer ceramic tube (472) and connected to the extrusion hole (464) of the tungsten steel nozzle (46); the stainless steel end cover (49) includes an wire entrance hole (491) corresponding to the inner ceramic tube (471).

the inner ceramic tube (471) having an outer wall and the outer ceramic tube (472) having an inner wall are formed with a first space disposed therebetween; the outer ceramic tube (472) having an outer wall and the holding position (460) having an inner wall are formed with a second space disposed therebetween, so that the entire ceramic tube bank (47) has a certain thermal insulation effect, preventing most metal wire through the ceramic tube bank 47 being molten effectively. In this way, the metal wire is conveyed downward continuously by the posterior solid metal wire in the transport process, the molten semisolid metal fluid is extruded out of the extrusion hole in the lower end of tungsten steel nozzle continuously, forming a continuous filar semisolid metal fluid, so as to enhance the print (extrusion) effect of printing head.

wherein the high temperature resistant ceramic protective sleeve (48) is sleeved on the external surface of tungsten steel nozzle (46) and contacted with the collar flange (462) at the lower end of tungsten steel nozzle (46); the high temperature resistant, ceramic protective sleeve (48) and an outer wall of tungsten steel nozzle (46) comprises a plurality of passages disposed therebetween for gas passing therethrough; the tungsten steel nozzle (46) includes a plurality of tilted gas blow-out holes (465) disposed at the collar flange (462) and connected to the passages; the high temperature resistant ceramic protective sleeve (48) includes a clearance groove (481) arranged in a lower end of an inner wall thereof and engaged with the gas blow-out hole (465).

Wherein the inert gas feeder (6) comprises a gas tank (61) mounted outside the frame (1), a regulating valve (62), and a gas tube; the gas tube is extended into the head (3) and connected to the gas blow-out hole (465) disposed in the printing head (42) and configured to jet inert gas. More specifically, the connecting base (41) comprises a recess (411) disposed at a front end thereof and provided for the printing head (42) installed therein, besides, the annular mounting part (461) is stably fixed in the tungsten steel nozzle (46) via the recess (411); and a gas orifice (412) disposed at a rear end thereof and provided for the recess (411) connected therewith; the gas orifice (412) is connected to the gas tube, so that the gas orifice (412) is connected to the gas blow-out hole (465) in the lower end of tungsten steel nozzle (46), the gas blow-out hole 465 can jet inert gases in the entire print run of printing head, so as to prevent the metal deposition layer formed of the semisolid metal fluid extruded from the printing head from being oxidized effectively, and the metal fluid is formed by cooling effectively. Thus, the work quality of this 3D printer is upgraded effectively, so as to manufacture good quality metal model products.

Said inert gases include argon gas, helium gas, $CO_2$ or mixed gas therewith.

wherein the tungsten steel nozzle (46) comprises a plurality of spaced first annular bulges (467) formed under the annular mounting position (461), a plurality of second annular bulges (468) disposed at the lower end thereof and corresponding to the first annular bulge (467) for the high temperature resistant ceramic protective sleeve (48) being concentrically sleeved on the external surface of tungsten steel nozzle (46) to form said passage, and a plurality of gas guide grooves (469) opened downward under the annular mounting position (461) thereof for the annular mounting position (461) being connected to the passage; the first annular bulge (468) is located between two adjacent gas guide grooves (469).

The holding position (460) in said tungsten steel nozzle (46) comprises a first holding position (4601) opened downward in the upper end face thereof for holding the outer ceramic tube (472) and a second holding position 4602 disposed at a bottom of the first holding position (4601) for holding the inner ceramic tube (471). The second holding position (4602) is connected to said extrusion hole (464), and the bottoms of both the first holding position (4601) and the second holding position (4602) are conical.

The head (3) is installed with a temperature controller (7) disposed at the lower end, thereof for controlling the heating power of said high frequency electric induction heating device (44). The temperature controller (7) comprises an infrared temperature probe being aligned with the lower end of the printing head (42). When the printing head (42) temperature value detected by the infrared temperature probe is lower than the set value, the heating power of high frequency electric induction heating device (44) is increased to make the printing head (42) work normally; When the printing head (42) temperature value detected by the in furred temperature probe is higher than the set value, the heating power of high frequency electric induction heating device (44) is decreased to make the printing head (42) work normally;

The present invention uses the high frequency electric induction heating device (44) and the high frequency coil (43) to heat the printing head (42), and the temperature of printing head (42) is detected instantly by the infrared temperature probe, so that the heating temperature can be controlled effectively for stable temperature and energy saving, and it is characterized by high heating temperature, wide control range, low cost and simple structure.

The high frequency coil (43) comprises an open heating ring (431) disposed in front thereof, and the lower end of tungsten steel nozzle (46) is clamped by the open heating ring (431). As the open heating ring (431) only heats the lower end of tungsten steel nozzle (46), the metal wire penetrating into the lower end of inner ceramic tube (471) is heated to semisolid fluid, the metal wire penetrating into the inner ceramic tube (471) is not softened ahead of time. Thus, the molten semisolid metal fluid can be extruded through the extrusion hole in the lower end of tungsten steel nozzle by solid metal wire in the metal wire transport process, forming a continuous filar semisolid metal fluid, so as to enhance the print (extrusion) effect of printing head, wherein the head (3) comprises at least one laser (31) mounted on a lower end face thereof and configured to locally preheat and melt a metal layer printed by the metal wire or enhance a binding force between the metal layers; the laser (31) is tilted, and a light beam irradiated from the laser (31) is focused under the printing head (42). More particularly, said laser (31) is a fiber optic coupling laser; there are two fiber optic coupling lasers, located on both sides of the printing head (42) respectively; the cross point of the light beams irradiated from the lasers (31) is straight under the printing head (42). The laser can locally preheat and melt the metal layer printed from metal wire or enhance the binding force between metal layers, so that the print effect and, model molding effect of the present invention can be improved, enhancing the marketability.

The feeding device (5) comprises a wire reel (51) disposed on the frame (1) and configured to place the metal wire, a first servomotor (52) configured to rotate the wire reel (51), a second servomotor (53) disposed in the head (3), a wire guide base (54) disposed at a front end of the second servomotor (53); the wire guide base (54) includes a wire pressing wheel (55) and an active wire feeding wheel (531) disposed therein; the active wire feeding wheel (531) and wire pressing wheel (55) convey the metal wire jointly. The wire pressing wheel (55) is formed with a ring groove disposed on an outer surface thereof and configured to clamp the metal wire.

The wire guide base 54) comprises an opening disposed in a middle thereof, an adjustable elastic mounting base (542) disposed on one side of the wire guide base (54); the wire pressing wheel (55) is mounted in the elastic mounting base (542), and its outer edge is exposed in the opening (541); the active wire feeding wheel (531) is mounted on a shaft of the second, servomotor (53) and exposed in the opening (541); a gap is formed between the active wire feeding wheel (531) and the wire pressing wheel (55) for clamping the conveyed metal wire; the wire guide base (54) includes through holes respectively disposed on an upper end and lower end thereof and corresponding to the gap; the through hole corresponds to a hole disposed on the printing head (42) and provided for the metal wire passing therethrough.

The frame further comprises a water-cooling plant (7) disposed thereon; the high frequency coil (43) having a copper pipe is formed with a flow channel for cold water passing therethrough; the water-cooling plant (7) is connected to the flow channel via a pipe.

The present invention uses semisolid casting (forming) technique, different from common casting technique:

In common casting process, the primary crystal grows up dendritically. When the solid phase rate is 20%-30%, the dendrite forms continuous network skeleton, the flowability basically disappears due to the grid structure formed of the solid phase solidified earlier.

In the semisolid casting process, as the pouring temperature of semisolid metal paste is controlled in the solid-liquid two-phase region, the solid phase in the paste suspends in the form of sphere-like non-dendritic structure in the liquid phase matrix, so that the melt has good rheological properties and thixotropy. When the solid phase rate is 40%-60%, the flowability is still good, the metal forming can be implemented by conventional forming processes, such as compression casting, extrusion and die forging.

Said metal flow refers to a sort of continuous filar and semisolid metal fluid extruded through the extrusion hole (464) of the tungsten steel nozzle (46).

The above shows and describes the fundamental principles, major characteristics and advantages of the present invention. Those skilled in the art shall understand that the present invention is not limited by the foregoing embodiments, and the foregoing embodiments and description only explain the principles of the present invention. The present invention may also have various modifications and improvements without departing from the spirit and scope of the present invention, these various modifications and improvements shall all fall within the protection scope of the present invention claimed which is defined by the appended claims and equivalents thereof.

I claim:

1. An extruded metal flow 3D printer comprising:
    a frame (1) including a workbench (2) capable of moving along an X-axis and Y-axis direction, and a head (3) capable of moving along a Z-axis direction;
    a printing device (4) including a printing head (42) fixed in the head (3) via a connecting base (41), a high frequency coil (43) and a high frequency electric induction heating device (44) for heating the printing head (42), the printing head (42) including a tungsten steel nozzle (46), a ceramic tube bank (47) disposed, inside the tungsten steel nozzle (46), a high temperature resistant ceramic protective sleeve (48) sleeved on an external, surface of the tungsten steel nozzle (46), and a stainless steel end cover (49) covered on an upper end of the tungsten steel nozzle (46); the tungsten steel nozzle (46) having an extrusion hole (464);
    a feeder (5) mounted on the frame (1) and configured to convey a metal wire to the printing device (4),
    wherein the head (3) comprises at least one laser (31) mounted on a lower end face thereof and configured to locally preheat and melt a metal layer printed by the metal wire or enhance a binding force between the metal layers; the laser (31) is tilted, and a light beam irradiated from the laser (31) is focused under the printing head (42); the frame (1) further comprises an inert gas feeder (6) mounted thereon and configured to supply inert gas to the printing head (42), so that the printing head (42) can jet inert gas;
    wherein the feeder (5) comprises a wire reel (51) disposed on the frame (1) and configured to place the metal wire, a first servomotor (52) configured to rotate the wire reel (51), a second servomotor (53) disposed in the head (3), a wire guide base (54) disposed at a front end of the second servomotor (53); the wire guide base (54) includes a wire pressing wheel (55) and an active wire feeding wheel (531) disposed therein; the active wire feeding wheel (531) and wire pressing wheel (55) convey the metal wire jointly.

2. The extruded metal flow 3D printer according to claim 1, wherein the laser (31) is a fiber optic coupling laser; there are two fiber optic coupling lasers, located on both sides of the printing head (42) respectively; the cross point of the light beams irradiated from the lasers (31) is straight under the printing head (42).

3. The extruded metal flow 3D printer according to 3, wherein the wire guide base (54) comprises an opening (541) disposed in a middle thereof, an adjustable elastic mounting base (542) disposed on one side of the wire guide base (54);
    the wire pressing wheel (55) is mounted in the elastic mounting base (542), and its outer edge is exposed in the opening (541); the active wire feeding wheel (531) is mounted on a shaft of the second servomotor (53) and exposed in the opening (541); a gap is formed between the active wire feeding wheel (531) and the wire pressing wheel (55) for clamping the conveyed metal wire; the wire guide base (54) includes through holes respectively disposed on an upper end and lower end thereof and corresponding to the gap; the through hole corresponds to a hole disposed on the printing head (42) and provided for the metal wire passing therethrough; the wire pressing wheel (55) is formed with a ring groove disposed on an outer surface thereof and configured to clamp the metal wire.

4. The extruded metal flow 3D printer according to claim 1, wherein the inert gas feeder (6) comprises a gas tank (61) mounted outside the frame (1), a regulating valve (62), and a gas tube; the gas tube is extended into the head (3) and connected to a cooling hole disposed in the printing head (42) and configured to jet inert gas; the connecting base (41) comprises a recess (411) disposed at a front end thereof and provided for the printing head (42) installed therein, and a gas orifice (412) disposed at a rear end thereof and provided for the recess (411) connected therewith; the gas orifice (412) is connected to the gas tube.

5. The extruded metal flow 3D printer according to claim 1, wherein the tungsten steel nozzle (46) comprises an annular mounting part (461) disposed at an upper end thereof, a collar flange (462) disposed at a lower end thereof, and a conical end (463) formed at a lower end of the collar flange (462) and having the extrusion hole (464); an aperture of the extrusion hole (464) is smaller than the diameter of metal wire.

6. The extruded metal flow 3D printer according to claim 5, wherein the ceramic tube bank (47) comprises an inner ceramic tube (471) and an outer ceramic tube (472) nested with each other and mounted in a holding position (460) in an inner chamber of the tungsten steel nozzle (46); the inner ceramic tube (471) having an upper end face is even with an upper end face of the outer ceramic tube (472); the inner ceramic tube (471) having a lower end is extended out of a lower end face of the outer ceramic tube (472) and connected to the extrusion hole (464) of the tungsten steel nozzle (46); the inner ceramic tube (471) having an outer wall and the outer ceramic tube (472) having an inner wall are formed with a first space disposed therebetween; the outer ceramic tube (472) having an outer wall and the holding position (460) having an inner wall are formed with a second space disposed therebetween; the, stainless steel end cover (49) includes a wire entrance hole (491) corresponding to the inner ceramic tube (471).

7. The extruded metal flow 3D printer according to claim 6, wherein the high temperature resistant ceramic protective sleeve (48) is sleeved on the external surface of tungsten steel nozzle (46) and contacted with the collar flange (462) at the lower end of tungsten steel nozzle (46);

the high temperature resistant ceramic protective sleeve (48) and an outer wall of tungsten steel nozzle (46) comprises a plurality of passages disposed therebetween for gas passing therethrough;

the tungsten steel nozzle (46) includes a plurality of tilted gas blow-out holes (465) disposed at the collar flange (462) and connected to the passages;

the high temperature resistant ceramic protective sleeve (48) includes a clearance groove (481) arranged in a lower end of an inner wall thereof and engaged with the gas blow-out hole (465).

8. The extruded metal flow 3D printer according to claim 7, wherein the tungsten steel nozzle (46) comprises a plurality of spaced first annular bulges (467) formed under the annular mounting position (461), a plurality of second annular bulges (468) disposed at the lower end thereof and corresponding to the first annular bulge (467) for the high temperature resistant ceramic protective sleeve (48) being concentrically sleeved on the external surface of tungsten steel nozzle, (46) to form said passage, and a plurality of gas guide grooves (469) opened downward under the annular mounting position (461) thereof for the annular mounting position (461) being connected to the passage;

the first annular bulge (468) is located between two adjacent gas guide grooves (469).

9. The extruded metal flow 3D printer according to claim 1, wherein the frame further comprises a water-cooling plant (7) disposed thereon; the high frequency coil (43) having a copper pipe is formed with a flow channel for cold water passing therethrough; the water-cooling plant (7) is connected to the flow channel via a pipe.

* * * * *